US011906915B2

(12) United States Patent
Wilsher et al.

(10) Patent No.: US 11,906,915 B2
(45) Date of Patent: Feb. 20, 2024

(54) FUSER POWER REDUCTION CONTROLLER

(71) Applicant: Xerox Corporation, Norwalk, CT (US)

(72) Inventors: Michael J. Wilsher, Hertfordshire (GB); John R. Washington, Hertfordshire (GB); Graeme A. Adams, Cambridge (GB)

(73) Assignee: Xerox Corporation, Norwalk, CT (US)

(*) Notice: Subject to any disclaimer, the term of this patent is extended or adjusted under 35 U.S.C. 154(b) by 122 days.

(21) Appl. No.: 17/242,348

(22) Filed: Apr. 28, 2021

(65) Prior Publication Data

US 2022/0350278 A1 Nov. 3, 2022

(51) Int. Cl.
*G03G 15/20* (2006.01)
*B41J 29/393* (2006.01)
*G03G 15/00* (2006.01)

(52) U.S. Cl.
CPC .......... *G03G 15/205* (2013.01); *B41J 29/393* (2013.01); *G03G 15/5004* (2013.01)

(58) Field of Classification Search
None
See application file for complete search history.

(56) References Cited

U.S. PATENT DOCUMENTS 3,989,370 A 11/1976 Mooney
6,801,729 B2 10/2004 Wada et al.
6,907,204 B2 6/2005 Cho
7,079,782 B2 7/2006 Sone et al.
7,116,923 B2 10/2006 Kishi et al.
7,242,884 B2 7/2007 Baruch et al.
7,254,352 B2 8/2007 Lee
10,452,010 B2 10/2019 Cao et al.
2005/0265742 A1* 12/2005 Kwon ................ G03G 15/2039 399/69
2006/0192983 A1* 8/2006 Groarke ................. G06K 15/02 358/1.9
2016/0277635 A1* 9/2016 Kobayashi ......... H04N 1/40068

* cited by examiner

*Primary Examiner* — Alejandro Valencia

(74) *Attorney, Agent, or Firm* — Gibb IP Law Firm, LLC

(57) ABSTRACT

Printing apparatuses include a photoreceptor adapted to print an image by applying marking material to print media, a fuser adapted to heat the marking material on the print media, and a controller. The controller determines the amount of marking material per unit area of the image before the fuser heats the marking material on the print media. The controller rasterizes the image to produce a bitmap of the image, but the amount of marking material per unit area for the image is determined before completion of rasterization and marking of the image. The controller also adjusts the operating temperature of the fuser to a fusing temperature based on the amount of marking material per unit area of the image, causes the photoreceptor to print the image on the print media using the bitmap of the image, and causes the fuser to fuse the marking material to the print media.

18 Claims, 5 Drawing Sheets

FUSER POWER REDUCTION CONTROLLER

BACKGROUND

Systems and methods herein generally relate to printing devices and more particularly to power reduction controls for a fusing device.

Printers can consume a substantial amount of electrical power. One component that contributes to a printer's power consumption is the fuser device which generates heat in order to fuse marking material to sheets of print media. To further environmental goals and help meet ever tighter energy requirements, it can be helpful to make the fuser devices more energy efficient in order to reduce the electrical power consumption of printing devices.

SUMMARY

Various printing apparatuses herein include (among other components) a marking material application device (e.g., photoreceptor) adapted to print an image (e.g., a page) by applying marking material (e.g., inks, toners, etc.) to print media, a heating device (e.g., fuser) adapted to heat the marking material on the print media, and a controller that is connected to the other components and is adapted to control the other components. In devices and methods herein, the controller is adapted to determine the amount (e.g., density, concentration, etc.) of marking material per unit area of the image before the image is rasterized and before the heating device heats the marking material on the print media. Therefore, the controller is adapted to rasterize the image to produce a bitmap of the image, but the amount of marking material per unit area for the image is determined before completion of rasterization of the image and this allows more time for the temperature of the heating device to be changed.

The controller is therefore adapted to adjust the operating temperature of the heating device to a fusing temperature based on the amount of marking material per unit area of the image, cause the marking material application device to print the image using the bitmap of the image, and cause the heating device to fuse the marking material to the print media. More specifically, the controller is adapted to reduce the temperature of the heating device for relatively lower amounts of the marking material per unit area and to increase the temperature of the heating device for relatively higher amounts of the marking material per unit area. The controller is adapted to cause the marking material application device to print the image only when the operating temperature of the heating device is at the fusing temperature and higher temperatures. Thus, the estimation of the fuser temperature is performed earlier in the image pipeline (prior to starting marking) as opposed to at a post-bitmap stage during marking, allowing the fuser temperature to be adjusted prior to the page being printed and eliminating any wait time for the fuser to warm up. It should be noted that low area coverages can be fused at the higher temperature with no detriment to the result, but high area coverages should prepare the fuser to be at a sufficient temperature to fuse successfully.

In greater detail, the controller is adapted to determine the amount of marking material per unit area of the image by first lowering the resolution of the image (to a reduced resolution image, which speeds up computation as only an estimate of local area coverage like solid areas which need more heat to successfully fuse) and then determining the amount of marking material per unit area of the reduced resolution image. In one example, the controller can be adapted to reduce the resolution of the image to a reduced resolution that maintains the number of pixels of the reduced resolution image below a pixel maximum. The controller is adapted to evaluate pixels of the reduced resolution image, where each pixel is evaluated as a distinct area of averaged marking material coverage. The controller is adapted to set the image's "amount of marking material per unit area" used to establish the fuser temperature for that image equal to the pixel area of the image that has the highest averaged marking material coverage.

This disclosure also presents various methods of controlling a printing apparatus, where such methods estimate, from a lower resolution image, further back in the image pipeline (prior to starting marking) the amount of marking material per unit area of an image. The process of determining the amount of marking material per unit area of the image can, in one implementation, lower the resolution of the image (to a reduced resolution image, resulting in reduced processing) and determine the amount of marking material per unit area of the reduced resolution image.

In one example, these methods can reduce the resolution of the image to a reduced resolution that maintains the number of pixels of the reduced resolution image below a pixel maximum. This process of determining the amount of marking material per unit area of the image can evaluate pixels of the reduced resolution image, wherein each pixel area is evaluated as a distinct area of averaged marking material coverage. Additionally, the process of determining the amount of marking material per unit area of the image can set the image's "amount of marking material per unit area" used to establish the fuser temperature for that image equal to the pixel of the image that has the highest averaged marking material coverage.

These methods rasterize the image to produce a bitmap of the image, but the amount of marking material per unit area for the image is determined before completion of rasterization of the image. With methods herein a simple raster image pixel count is not sufficient because it is not the number of 'on' rater pixels that is used by processing herein, but the clustering of marks that forms the areas of high area coverage. Further, these methods adjust the operating temperature of a heating device of the printing apparatus to a fusing temperature based on the amount of marking material per unit area of the image (represented by a local pixel value of the reduced resolution image), and these methods apply (using a marking material application device of the printing apparatus) marking material to print media to print the image on the print media using the bitmap of the image. These methods then heat, via the fusing element, the marking material on the print media to fuse the marking material to the print media using the heating device. The fusing of the marking material to the print media occurs only when the operating temperature of the heating device is at the fusing temperature and higher temperatures.

These and other features are described in, or are apparent from, the following detailed description.

BRIEF DESCRIPTION OF THE DRAWINGS

Various exemplary systems and methods are described in detail below, with reference to the attached drawing FIGS., in which.

DETAILED DESCRIPTION

Figure 1:
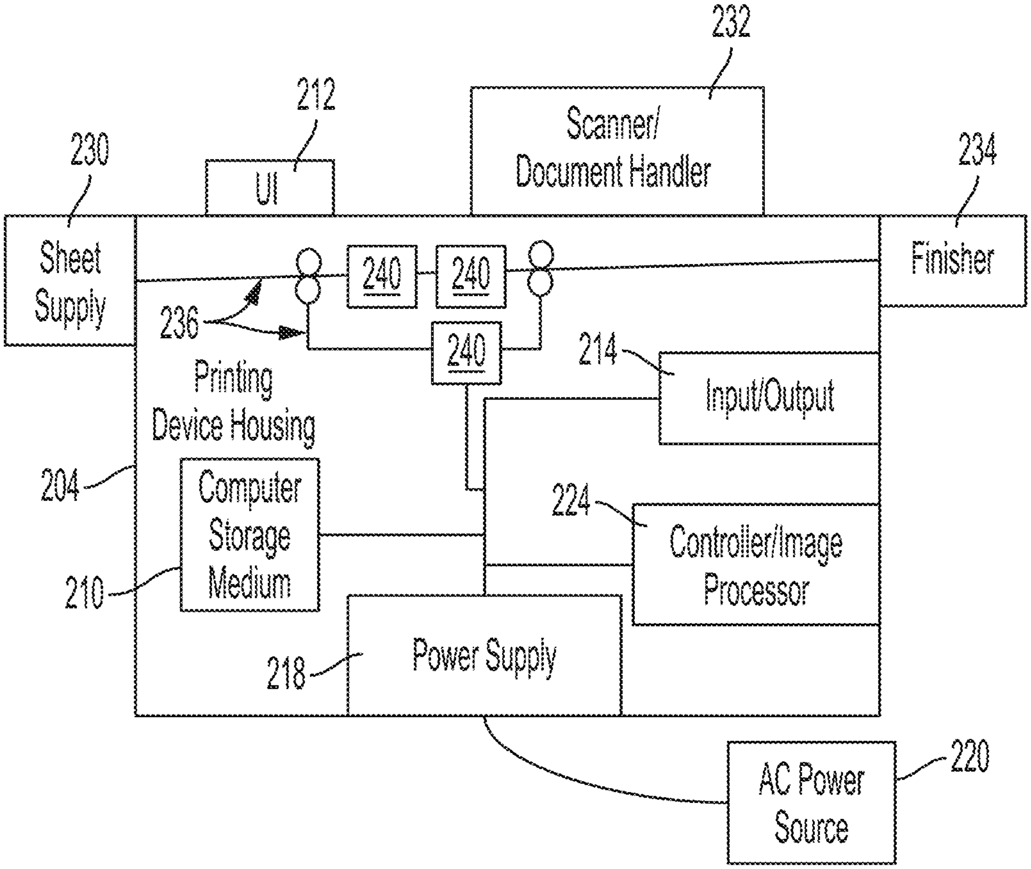
FIG. 1 is a schematic diagram illustrating printing devices herein.

As mentioned above, to meet ever tighter energy requirements it can be useful to reduce printer power consumption by limiting the amount of power the fuser device consumes. One possible method is to reduce the fuser temperature for images with relatively lower area toner coverage that do not lose image quality substantially at lower fusing temperatures. For images that have relatively higher area toner coverage, the fuser temperature cannot be reduced without unacceptable image quality loss and, therefore, the higher fuser temperature is still used to maintain image quality. In one example, the fuser power usage difference between the higher temperature fuser operation and the lower temperature fuser operation can be in the region of 20% less power consumed for the lower area coverage image (note that this is dependent on the exact fuser and technology).

One way to determine if an image has high or low area toner coverage would be to evaluate the bitmap used to print the image by counting the number of pixels that will print as a ratio of the total number of pixels within the image. Such a process would only provide an overall average toner coverage for the entire image. In one example, an overall average toner coverage of 20% would not be distinguished from a local area of 100% coverage for 20% of the page, because these two situations would have the same pixel count (same overall overage toner coverage (e.g., 20%)) but the high area coverage of the local area that had 100% coverage would require a high fuser temperature.

Some other issues with such a process are that the calculation of the overall average toner coverage (that is based upon the ratio of printing pixels to non-printing pixels in the bitmap) may be a time and processing resource intensive activity and may only be completed after the bitmap has been produced (after rasterization). Determining the overall average toner coverage at this point in the printing cycle can delay printing operations, which are generally ready to proceed as soon as rasterization is completed. Further, the delays introduced by performing the overall average toner coverage calculation post-rasterization can be compounded by the fact it takes additional time to change the temperature of the fusing device, and such can be performed only after the overall average toner coverage calculation has been completed.

Additionally, because these processes take an average of the overall toner coverage of the entire image (or, more accurately, the entire bitmap) such may inadvertently miss localized areas of high toner coverage, which can result in a fusing operation that is performed at a temperature insufficient for these localized areas of high toner coverage even though the average is within an acceptable range, which can produce image quality errors if fusing of such localized areas of high toner coverage fails because of insufficient fusing temperature.

In order to safeguard against such printing delays and image quality defects, the reduction of the temperature of the fusing device may be limited only to situations where printing delays are acceptable or for average toner coverage values that are well within very conservative safe harbor ranges. Therefore, while energy savings can be achieved by basing fuser temperature reductions on average toner coverage values calculated from the bitmap, it would be useful to eliminate such delays and expand the situations where lower temperature fuser operations could be utilized.

In view of such issues and in order to improve fuser device energy efficiency further, this disclosure provides devices and methods that only use a higher fuser temperature when the image has localized areas of high area toner coverage. The is different than toner coverage averages based upon the ratio of printing pixels to non-printing pixels in the bitmap because pixel/bitmap based toner coverage averages only look at the page as a whole and may not address the issue that the fuser temperature needs to be high for any areas of high area coverage in the image for proper fusing to maintain high image quality. Additionally, processes that control fuser temperatures based on pixel counts within the bitmap must wait until the image is converted into the bitmap, which is just before the print is made, and this may not allow the fuser to change temperature quickly enough before printing occurs.

In some non-limiting examples, the devices and methods herein can determine the area coverage for an image well in advance of rasterization of the image into a bitmap by first creating an ultra-low resolution image (e.g., 20×30 pixel image) which forms an image having 20 blocks× 30 blocks, where the darkness of each block can vary from adjacent blocks, but each block (pixel) has a uniform darkness within the area of the block (uniform density of marking material within each pixel). Such can be suitable for monochrome images; and for color images, a different ultra-low resolution image be made for each color separation. For example, the industry-standard cyan, magenta, yellow, black (CMYK) separations can be created from a very crude matrix conversion from the industry-standard red, green, blue (RGB) as they only need to provide an estimation for the separation, hence this function can be performed at the input to the processing pipeline, giving a pipeline delay which is advantageous to fuser control. The ultra-low resolution image can be made from a bitmap, if such is already available, but can also be made from the grayscale image that is supplied to the rasterization process.

The fuser temperature can be dependent on the highest area coverage block (e.g., darkest block) for monochrome and the highest area coverage block for all color separations or combinations when a color image is being analyzed. The highest area coverage block (pixel) can therefore, in some options, be used to set the temperature of the fuser device.

The ultra-low resolution image used to calculate the localized area toner coverage is formed before rasterization (before the halftone image is created) allowing ample time for the temperature of the fuser device to be adjusted. Additionally, different temperature steps for fuser operation can be selected as the area coverage (darkness) of each pixel (block) exceeds, or fall short of, a threshold area coverage. Changing the resolution of the ultra-low resolution image may slow processing time, but can increase temperature accuracy of the fuser device.

Also, such processing can be performed line-by-line for an image or image-by-image in a "pipeline" manner during printing, keeping note of the area coverage found at any point during the pipeline process and adjusting the fuser temperature accordingly.

Further, in some examples herein, processing herein can start with (default to) a low fuser temperature and only be raised when the pipeline process finds localized areas of high toner coverage so as to be the most energy efficient, and this works for most typical images. Thus, in such processing, the fuser temperature is only raised if high area coverage images are found in the pipeline during the printing process. The printing can be temporarily paused to allow the fuser temperature to be raised, if necessary, so that high area coverage images are only printed once the fuser is up to temperature. Any image can be printed at high temperature, so the printing can continue while allowing a high temperature fuser to cool down if there are no high coverage areas in the pipeline. In other options, where printing delays are to be avoided, the fuser can start at a relatively higher temperature, which can be adjusted downward if no high coverage areas are identified in the pipeline. Additionally, the devices and methods herein can user an ion fuser that is more practical because the speed of response is faster.

FIG. 1 illustrates many components of printer structures 204 herein that can comprise, for example, a printer, copier, multi-function machine, multi-function device (MFD), etc. The printing device 204 includes a controller/tangible processor 224 and a communications port (input/output) 214 operatively connected to the tangible processor 224 and to a computerized network external to the printing device 204. Also, the printing device 204 can include at least one accessory functional component, such as a user interface (UI) assembly 212. The user may receive messages, instructions, and menu options from, and enter instructions through, the user interface or control panel 212.

The input/output device 214 is used for communications to and from the printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 1, a body housing has one or more functional components that operate on power supplied from an alternating current (AC) source 220 by the power supply 218. The power supply 218 can comprise a common power conversion unit, power storage element (e.g., a battery, etc.), etc.

The printing device 204 includes at least one marking device (printing engine(s)) 240 that use marking material, and are operatively connected to a specialized image processor 224 (that may be different from a general purpose computer because it is specialized for processing image data, or may be identical to a general purpose computer), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

Figure 2:
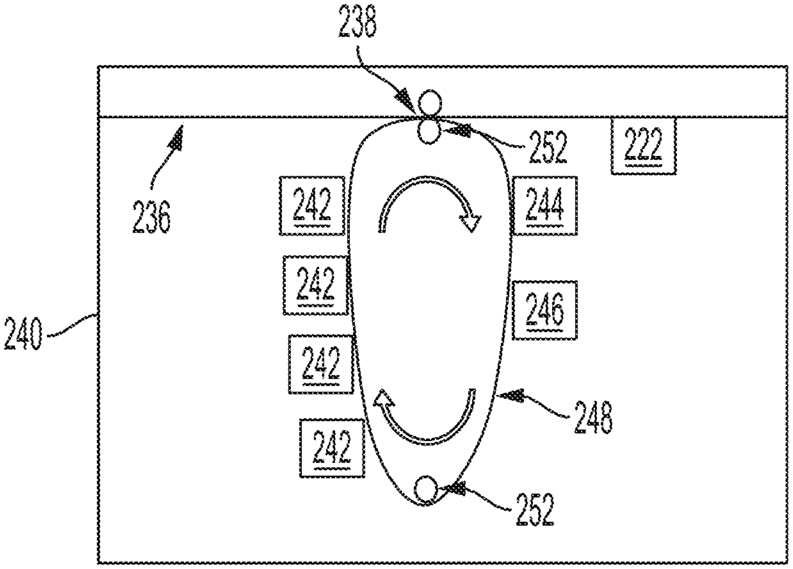
FIGS. 2 and 3 are schematic diagrams illustrating printing engines herein.
Figure 3:
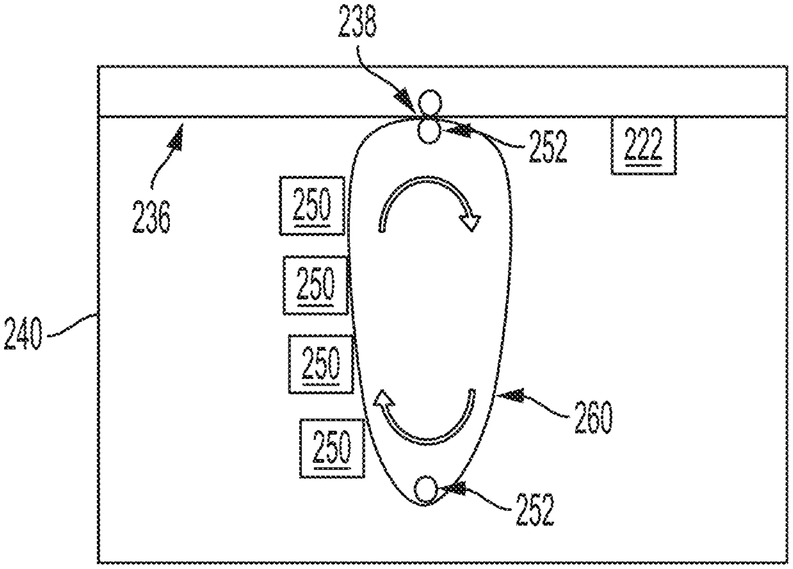

The one or more printing engines 240 are intended to illustrate any marking device that applies a marking material (toner, inks, etc.) to continuous media or sheets of media, whether currently known or developed in the future and can include, for example, devices that use a photoreceptor belt 248 (as shown in FIG. 2) or an intermediate transfer belt 260 (as shown in FIG. 3), or devices that print directly to print media (e.g., inkjet printers, ribbon-based contact printers, etc.).

More specifically, FIG. 2 illustrates one example of the above-mentioned printing engine(s) 240 that uses one or more (potentially different color) development stations 242 adjacent a photoreceptor belt 248 supported on rollers 252. Thus, in FIG. 2 an electronic or optical image or an image of an original document or set of documents to be reproduced may be projected or scanned onto a charged surface of the photoreceptor belt 248 using an imaging device (sometimes called a raster output scanner (ROS)) 246 to form an electrostatic latent image. Thus, the electrostatic image can be formed onto the photoreceptor belt 248 using a blanket charging station/device 244 (and item 244 can include a cleaning station, or a separate cleaning station can be used) and the imaging station/device 246 (such as an optical projection device, e.g., raster output scanner). Thus, the imaging station/device 246 changes a uniform charge created on the photoreceptor belt 248 by the blanket charging station/device 244 to a patterned charge through light exposure, for example.

The photoreceptor belt 248 is driven (using, for example, driven rollers 252) to move the photoreceptor in the direction indicated by the arrows past the development stations 242, and a transfer station 238. Note that devices herein can include a single development station 242, or can include multiple development stations 242, each of which provides marking material (e.g., charged toner) that is attracted by the patterned charge on the photoreceptor belt 248. The same location on the photoreceptor belt 248 is rotated past the imaging station 246 multiple times to allow different charge patterns to be presented to different development stations 242, and thereby successively apply different patterns of different colors to the same location on the photoreceptor belt 248 to form a multi-color image of marking material (e.g., toner) which is then transferred to print media at the transfer station 238.

As is understood by those ordinarily skilled in the art, the transfer station 238 generally includes rollers and other transfer devices. Further, item 222 represents a fuser device that is generally known by those ordinarily skilled in the art to include heating devices and/or rollers that fuse or dry the marking material by applying heat and pressure to permanently fuse/bond the marking material to the print media.

Thus, in the example shown in FIG. 2, which contains four different color development stations 242, the photoreceptor belt 248 is rotated through four revolutions in order to allow each of the development stations 242 to transfer a different color marking material (where each of the development stations 242 transfers marking material to the photoreceptor belt 248 during a different revolution). After all such revolutions, four different colors have been transferred to the same location of the photoreceptor belt, thereby forming a complete multi-color image on the photoreceptor belt, after which the complete multi-color image is transferred to print media, traveling along the media path 236, at the transfer station 238.

Alternatively, printing engine(s) 240 shown in FIG. 1 can utilize one or more potentially different color marking stations 250 and an intermediate transfer belt (ITB) 260 supported on rollers 252, as shown in FIG. 3. The marking stations 250 can be any form of marking station, whether currently known or developed in the future, such as individual electrostatic marking stations, individual inkjet stations, individual dry ink stations, etc. Each of the marking stations 250 transfers a pattern of marking material to the same location of the intermediate transfer belt 260 in sequence during a single belt rotation (potentially independently of a condition of the intermediate transfer belt 260) thereby, reducing the number of passes the intermediate transfer belt 260 must make before a full and complete image is transferred to the intermediate transfer belt 260.

Figure 4:
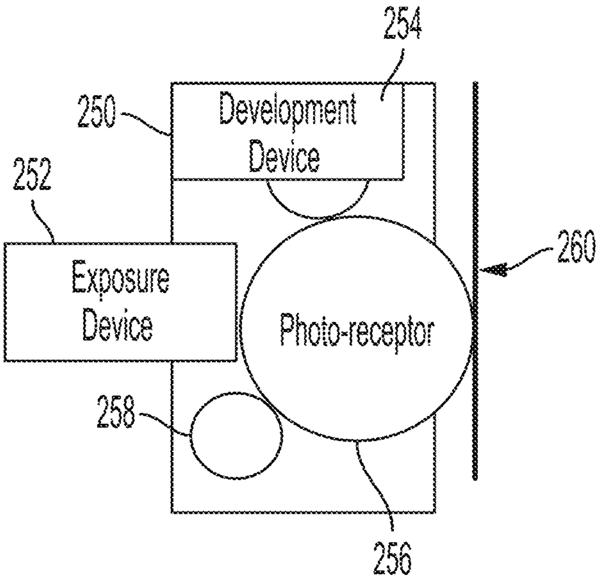
FIG. 4 is a schematic diagram illustrating development devices herein.

One exemplary individual electrostatic marking station 250 is shown in FIG. 4 positioned adjacent to (or potentially in contact with) intermediate transfer belt 260. Each of the individual electrostatic marking stations 250 includes its own charging station 258 that creates a uniform charge on an internal photoreceptor 256, an internal exposure device 252 that patterns the uniform charge, and an internal development device 254 that transfers marking material to the photoreceptor 256. The pattern of marking material is then transferred from the photoreceptor 256 to the intermediate transfer belt 260 and eventually from the intermediate transfer belt to the marking material at the transfer station 238.

While FIGS. 2 and 3 illustrate four marking stations 242, 250 adjacent or in contact with a rotating belt (248, 260), which is useful with systems that mark in four different colors such as, red, green, blue (RGB), and black; or cyan, magenta, yellow, and black (CMYK), as would be understood by those ordinarily skilled in the art, such devices could use a single marking station (e.g., black) or could use any number of marking stations (e.g., 2, 3, 5, 8, 11, etc.).

Thus, in printing devices herein a latent image can be developed with developing material to form a toner image corresponding to the latent image. Then, a sheet is fed from a selected paper tray supply to a sheet transport for travel to a transfer station. There, the image is transferred to a print media material, to which it may be permanently fixed by a fusing device. The print media is then transported by the sheet output transport 236 to output trays or a multi-function finishing station 234 performing different desired actions, such as stapling, hole-punching and C or Z-folding, a modular booklet maker, etc., although those ordinarily skilled in the art would understand that the finisher/output tray 234 could comprise any functional unit.

As would be understood by those ordinarily skilled in the art, the printing device 204 shown in FIG. 1 is only one example and the systems and methods herein are equally applicable to other types of printing devices that may include fewer components or more components. For example, while a limited number of printing engines and paper paths are illustrated in FIG. 1, those ordinarily skilled in the art would understand that many more paper paths and additional printing engines could be included within any printing device used with systems and methods herein.

Therefore, various printing apparatuses herein include (among other components) a marking material application device 248, 260 (e.g., photoreceptor) adapted to print an image by applying marking material (e.g., toners, inks, etc.) to print media, a fuser 222 (e.g., fuser) adapted to heat the marking material on the print media to permanently fuse/bind the marking material to the print media, and a controller 224 connected to the other components and adapted to control the other components.

The controller 224 is also adapted to determine the amount (e.g., concentration, density, darkness level, etc.) of marking material per unit area (e.g., per pixel, per square millimeter, per square inch, etc.) of the image before the controller 224 completes rasterization, before the marking material application device 248, 260 completes the processing of applying marking material for the image, and/or before the fuser 222 heats the marking material on the print media. After (or while) determining the amount of marking material per unit area for the image, the controller 224 is adapted to rasterize the image to produce a bitmap of the image. In any case, the amount of marking material per unit area for the image is determined before completion of rasterization of the image and/or completion of the marking of the image.

The controller 224 is also adapted to adjust the operating temperature of the fuser 222 to a fusing temperature based on the amount of marking material per unit area of the image, cause the photoreceptor 248, 260 to print the image using the bitmap of the image, and cause the fuser 222 to fuse the marking material to the print media at the fusing temperature. The controller 224 is adapted to reduce the temperature of the fuser 222 for relatively lower amounts of the marking material per unit area and to increase the temperature of the fuser 222 for relatively higher amounts of the marking material per unit area. The controller 224 is adapted to cause the photoreceptor 248, 260 to print the image only when the operating temperature of the fuser 222 is at the fusing temperature and higher temperatures.

In one non-limiting specific example, the controller 224 is adapted to determine the amount of marking material per unit area of the image by first lowering the resolution of the image (to a reduced resolution image) and then determining the amount of marking material per unit area of the reduced resolution image. In one example, the controller 224 can be adapted to reduce the resolution of the image to a reduced resolution that maintains the number of pixels of the reduced resolution image below a pixel maximum. The controller 224 is adapted to evaluate pixels of the reduced resolution image, where each reduced resolution (e.g., larger) pixel is evaluated as a distinct area of "averaged" marking material coverage. In one example, the controller 224 is adapted to set the amount of marking material per unit area of the image equal to a pixel of the image that has the highest averaged marking material coverage. In another example, an average of some or more of the marking material per unit areas of various pixels can be utilized as the marking material per unit area of the reduced resolution image.

Figure 5:
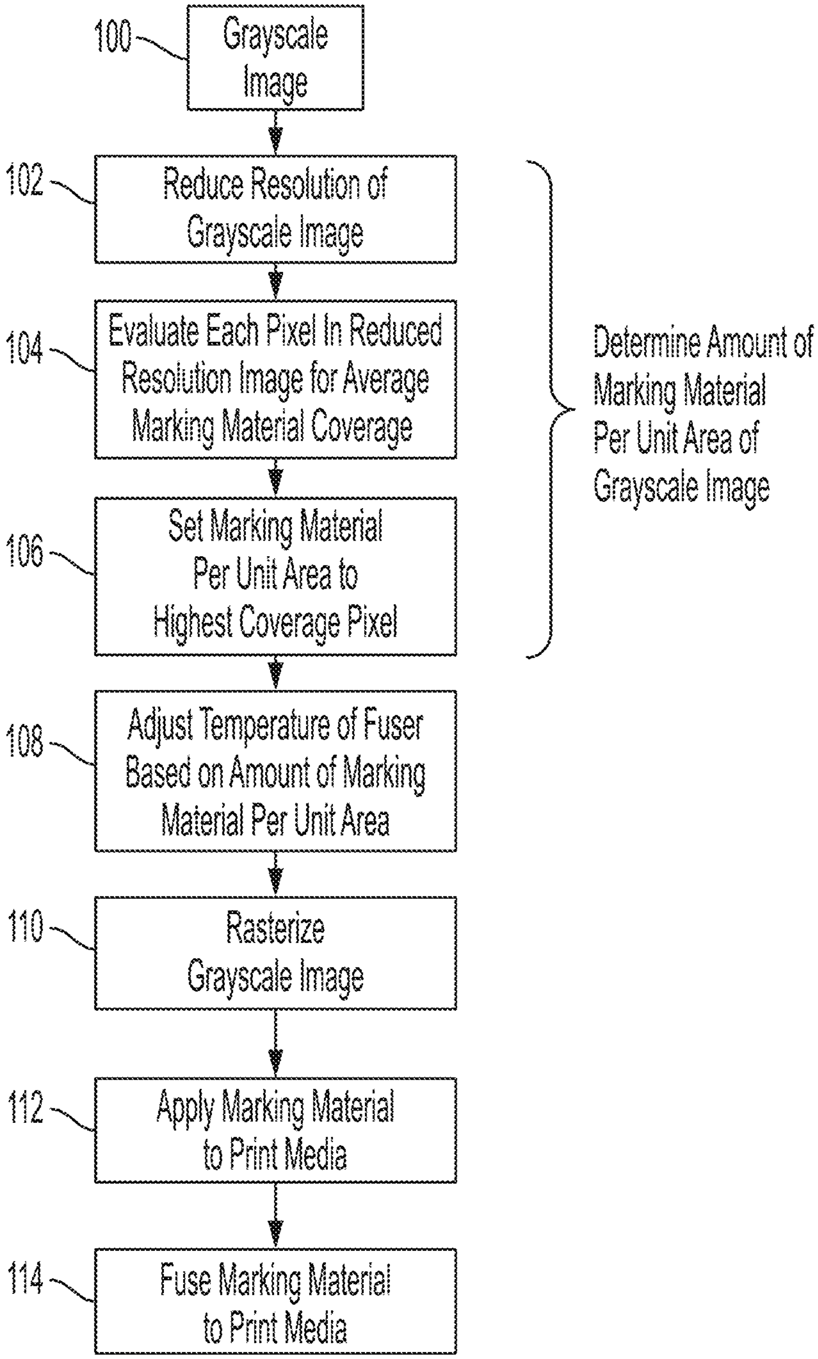
FIG. 5 is a flow diagram of various methods herein.

FIG. 5 is a flowchart illustrating aspects of various methods of controlling a printing apparatus herein. In preparation of the rasterization process that forms a bitmap, print processors either receive a grayscale image or create the grayscale image from the file that is received for printing. An exemplary grayscale image is shown as item 300 in FIG. 6.

In items 102-106, such methods determine the amount of marking material per unit area of the grayscale image. Printers commonly receive items to be printed in many different formats. Some of these formats provide one or more grayscale images to the printer. For example, some color formats provide a different grayscale image for each color separation. In other examples, the format of the item supplied to the printer requires the item to be converted into one or more grayscale images. In any case, it is usually very useful to utilize a grayscale image when performing rasterization because such is more efficient for the rasterization process.

Therefore, a grayscale image is usually available well before rasterization commences and the use of the grayscale images by processing herein does not add additional processing burden to existing print processes. Further, the process of calculating the marking material per unit area herein can be performed well before rasterization has been completed, while the rasterization process is occurring (the two processes can be performed simultaneously (i.e., at the same time)), or even as late as before the completion of the marking process, so that the marking material per unit area calculation does not delay existing processing.

More specifically, item 102 shows that the processes herein begin the process of determining the amount of marking material per unit area of the image by dramatically lowering the resolution of the grayscale image (to a reduced resolution image). An exemplary reduced resolution image is shown as item 310 in FIG. 6. The amount of marking material per unit area is determined using this reduced resolution image produced in item 102.

In one example, in item 102 these methods can reduce the resolution of the grayscale image obtained in item 100 to a reduced resolution that maintains the number of pixels of the reduced resolution image below a pixel maximum (e.g., below 100 pixels, 1000 pixels, 10,000 pixels, etc.), or other measures of resolution reduction can be used (e.g., a percentage reduction can be used, a maximum rectangular pixel size can be used, etc.). The pixel maximum can be a substantially decreased ratio of the resolution of the grayscale image supplied to the rasterization process. For example, the reduced resolution image can have 1% (1/100), 0.5% (1/500), 0.1% (1/1000), 0.05% (1/5000), 0.001% (1/10,000), etc., the of number of pixels of the grayscale image supplied to the rasterization process. Stated differently, the grayscale image supplied to the rasterization process can have 100 times, 500 times, 1000 times, 5000 times, 10,000 times, etc., the number of pixels of the reduced resolution image used to determine the amount of marking material per unit area of the image, meaning that each pixel of the reduced resolution image is 100 times, 500 times, 1000 times, 5000 times, 10,000 times, etc., larger than the pixels of the grayscale image supplied to the rasterization process.

By so dramatically reducing the resolution of the grayscale image supplied to the rasterization process, the processing herein forms relatively very large pixels. Within images, each pixel has a single darkness (e.g., is a single, uniform dot) and therefore each pixel is a uniform area of marking material coverage that represents the average marking material used for the area of the dot. Therefore, the processing herein effectively creates areas of "averaged" marking material coverage by dramatically enlarging the pixel size, where each pixel defines an area of "averaged marking material coverage." The processing overhead used to reduce the resolution of an image is relatively very small and does not consume substantial time, especially when compared to the processing overhead of the rasterization process, and this allows the calculations of marking material coverage herein to generally be performed before the rasterization process is complete, even if the same are started at the same time (started simultaneously). In many embodiments herein, the calculations of marking material coverage are performed before the rasterization process is even started, allowing ample time to change the temperature of the fuser.

Item 104 shows that this process of determining the amount of marking material per unit area of the image can evaluate pixels of the reduced resolution image, wherein each pixel can be evaluated as a distinct area of averaged marking material coverage. Additionally, item 106 shows that the process of determining the amount of marking material per unit area of the image can set the "amount of marking material per unit area of the image" (that is used to determine the temperature of the fuser) equal to the pixel of the image that has the highest "averaged marking material coverage."

Figure 6:
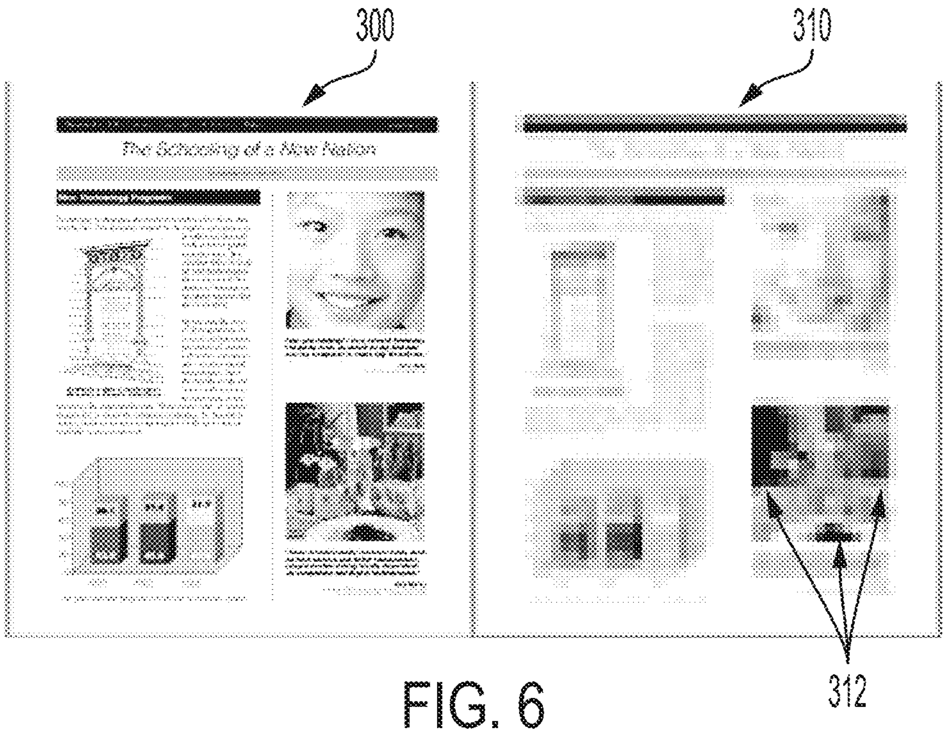
FIG. 6 is a schematic diagram illustrating an image processed by devices and methods herein.
Figure 7:
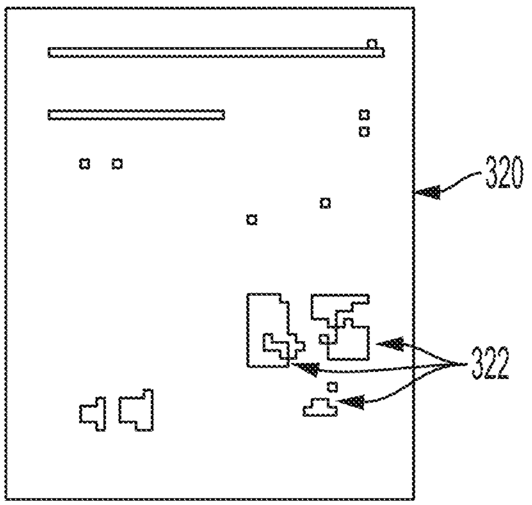
FIG. 7 is a schematic diagram illustrating a threshold product of the image shown in FIG. 6 by devices and methods herein.

In one example shown in FIG. 6, some of the pixels 312 of the reduced resolution image 310 can be evaluated in item 104. For example, when a marking material per unit area threshold is applied to the reduced resolution image 310, the resulting thresholded image is shown in FIG. 7. Note that the pixels 312 in FIG. 6 have sufficient marking material per unit area to remain in FIG. 7 (identified as items 322) to indicate that elevated temperature fusing should be performed on the image.

Therefore, the processing (and controllers) herein can determine the amount of marking material per unit area for the grayscale image and the corresponding temperature setting for the heating device (fuser) in a number of different ways. For example, the amount of marking material per unit area can be provided for each image (page) of a print job individually. Additionally, the amount of marking material per unit area for an entire image can be determined based only upon the single darkest pixel in the image (the single pixel in the image having the highest amount of marking material per unit area).

In other alternatives, limits can be set based upon how many pixels within the reduced resolution image exceed a maximum for the amount of marking material per unit area. Using the example shown in FIG. 7, such processing may only increase the fuser temperature if a predetermined number of pixels (e.g., 500, 1000, 5000, etc.) exceed a threshold for the amount of marking material per unit area. In other examples, (again using FIG. 7 as an example) only those pixels that exceed the threshold for the amount of marking material per unit area can be averaged and that number can be compared to a maximum to determine whether the fuser temperature should be increased. This processing can also be distinct for color images where each color separation can be considered individually using different pixel maximums, color separations can be averaged, color separations can be analyzed using the above limits and/or thresholds, etc.

Also, depending upon fuser capabilities, the fuser temperature can be increased in steps (high/low, steps 1-5, etc.) based upon whether various limits of the amount of marking material per unit area are exceeded. In other options, the fuser temperature control can be infinitely variable and can be infinitely varied based upon the number of pixels which exceed the amount of marking material per unit area limit of based upon the magnitude by which the amount of marking material per unit area exceeds a limit, or other number or ratio relating to the amount of marking material per unit area, etc.

Potentially, at the same time that the rasterization (110, discussed below) is being performed or before, in item 108, these methods adjust the operating temperature of a heating device of the printing apparatus to a fusing temperature based on the amount of marking material per unit area of the image determined in item 106. After or while determining the amount of marking material per unit area for the image, in item 110 these methods rasterize the grayscale image to produce a bitmap of the image. Whether the amount of marking material per unit area for the image is determined before or simultaneously with rasterization, the amount of marking material per unit area for the image is determined before completion of rasterization of the image or at least before the application of the marking material (112, discussed below) is completed. The timing of when the operating temperature of the heating device is changed (108) depends upon how quickly the heating device changes temperature and when the image is expected to be printed. The overall goal is to have the heating device reach the fusing temperature (108) before the image is printed (112), but only stay at relatively elevated temperatures for a little time as needed to maintain image quality and, in this way, the energy efficiency of the heating device is improved by the devices and methods herein.

In item 112, these methods apply (using a marking material application device of the printing apparatus) marking material to print media to print the image on the print media using the bitmap of the image. These methods then heat the marking material on the print media to fuse the marking material to the print media using the heating device in item 114. The fusing of the marking material to the print media 114 occurs only when the operating temperature of the heating device is at the fusing temperature and higher temperatures.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock TX, USA and Apple Computer Co., Cupertino CA, USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, CT, USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

A contone is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones. The term halftoning refers to a process of representing a contone image as a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications.

Traditional clustered dot halftones were restricted to a single frequency because they were generated using periodic gratings that could not be readily varied spatially. Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink).

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A printing apparatus comprising:

a marking material application device adapted to print a print image by applying marking material to print media;

a heating device adapted to heat the marking material on the print media; and a controller adapted to:

determine an amount of marking material per unit area of the print image before rasterization of the print image by lowering resolution of the print image to a reduced resolution image and determining the amount of marking material per unit area based on image pixels of the reduced resolution image;

rasterize the print image to produce a bitmap of the print image after determining the amount of toner per unit area;

adjust an operating temperature of the heating device to a fusing temperature based on the amount of marking material per unit area of the print image;

cause the marking material application device to print the print image on the print media using the bitmap of the print image; and cause the heating device to fuse the marking material to the print media at the fusing temperature.

2. The printing apparatus according to claim 1, wherein the controller is adapted to evaluate the image pixels of the reduced resolution image, wherein each of the image pixels is a distinct area of averaged marking material coverage.

3. The printing apparatus according to claim 2, wherein the controller is adapted to set the amount of marking material per unit area of the print image equal to one of the image pixels of the reduced resolution image that has a highest of the averaged marking material coverage.

4. The printing apparatus according to claim, 1 wherein the controller is adapted to reduce the resolution of the print image to a resolution that maintains a number of pixels of the reduced resolution image below a pixel maximum.

5. The printing apparatus according to claim 1, wherein the controller is adapted to cause the marking material application device to print the print image only when the operating temperature of the heating device is at the fusing temperature and higher temperatures.

6. The printing apparatus according to claim 1, wherein the controller is adapted to reduce the fusing temperature of the heating device for relatively lower amounts of the marking material per unit area and to increase the fusing temperature of the heating device for relatively higher amounts of the marking material per unit area.

7. A printing apparatus comprising:

a photoreceptor adapted to print a print image by applying toner to print media;

a fuser adapted to apply heat and pressure on the toner on the print media to fuse the toner to the print media; and a controller adapted to:

determine an amount of toner per unit area of the print image before rasterization of the print image by lowering resolution of the print image to a reduced resolution image and determining the amount of toner per unit area based on image pixels of the reduced resolution image;

rasterize the print image to produce a bitmap of the print image after determining the amount of toner per unit area;

adjust an operating temperature of the fuser to a fusing temperature based on the amount of toner per unit area of the print image;

cause the photoreceptor to print the print image on the print media using the bitmap of the print image; and cause the fuser to fuse the toner to the print media at the fusing temperature.

8. The printing apparatus according to claim 7, wherein the controller is adapted to evaluate the image pixels of the reduced resolution image, wherein each of the image pixels is a distinct area of averaged marking material coverage.

9. The printing apparatus according to claim 8, wherein the controller is adapted to set the amount of marking material per unit area of the print image equal to one of the image pixels of the reduced resolution image that has a highest of the averaged marking material coverage.

10. The printing apparatus according to claim 7, wherein the controller is adapted to reduce the resolution of the print image to a resolution that maintains a number of pixels of the reduced resolution image below a pixel maximum.

11. The printing apparatus according to claim 7, wherein the controller is adapted to cause the photoreceptor to print the print image only when the operating temperature of the fuser is at the fusing temperature and higher temperatures.

12. The printing apparatus according to claim 7, wherein the controller is adapted to reduce the fusing temperature of the fuser for relatively lower amounts of the toner per unit area and to increase the fusing temperature of the fuser for relatively higher amounts of the toner per unit area.

13. A printing apparatus comprising:

a photoreceptor adapted to print a print image by applying toner to print media;

a fuser adapted to apply heat and pressure on the toner on the print media to fuse the toner to the print media; and a controller adapted to:

determine an amount of toner per unit area of the print image before rasterization of the print image by lowering resolution of the print image to a reduced resolution image and using image pixels of the reduced resolution image;

rasterize the print image to produce a bitmap of the print image after determining the amount of toner per unit area;

adjust an operating temperature of the fuser to a fusing temperature based on the amount of toner per unit area of the print image;

cause the photoreceptor to print the print image on the print media using the bitmap of the print image; and cause the fuser to fuse the toner to the print media at the fusing temperature.

14. The printing apparatus according to claim 13, wherein the controller is adapted to evaluate the image pixels of the reduced resolution image, wherein each of the image pixels is a distinct area of averaged marking material coverage.

15. The printing apparatus according to claim 14, wherein the controller is adapted to set the amount of marking material per unit area of the print image equal to one of the image pixels of the reduced resolution image that has a highest of the averaged marking material coverage.

16. The printing apparatus according to claim 13, wherein the controller is adapted to reduce the resolution of the print image to a resolution that maintains a number of pixels of a reduced resolution image below a pixel maximum.

17. The printing apparatus according to claim 13, wherein the controller is adapted to cause the photoreceptor to print the print image only when the operating temperature of the fuser is at the fusing temperature and higher temperatures.

18. The printing apparatus according to claim 13, wherein the controller is adapted to reduce the fusing temperature of the fuser for relatively lower amounts of the toner per unit area and to increase the fusing temperature of the fuser for relatively higher amounts of the toner per unit area.

* * * * *